(12) United States Patent
Peulon-Page et al.

(10) Patent No.: US 12,195,368 B2
(45) Date of Patent: Jan. 14, 2025

(54) METHOD FOR DECONTAMINATING HEAVY METALS IN AN AQUEOUS SOLUTION

(71) Applicants: CENTRE NATIONAL DE LA RECHERCHE SCIENTIFIQUE, Paris (FR); UNIVERSITE D'EVRY VAL D'ESSONE, Evry (FR); CY CERGY PARIS UNIVERSITÉ, Cergy (FR)

(72) Inventors: Sophie Peulon-Page, Morsang sur Orge (FR); Rana Choumane, Evry (FR)

(73) Assignees: CENTRE NATIONAL DE LA RECHERCHE SCIENTIFIQUE, Paris (FR); UNIVERSITE D'EVRY VAL D'ESSONNE, Evry (FR); CY CERGY PARIS UNIVERSITE, Cergy (FR)

( * ) Notice: Subject to any disclaimer, the term of this patent is extended or adjusted under 35 U.S.C. 154(b) by 935 days.

(21) Appl. No.: 17/255,533

(22) PCT Filed: Jun. 28, 2019

(86) PCT No.: PCT/EP2019/067482
§ 371 (c)(1),
(2) Date: Dec. 23, 2020

(87) PCT Pub. No.: WO2020/002683
PCT Pub. Date: Jan. 2, 2020

(65) Prior Publication Data
US 2021/0221710 A1    Jul. 22, 2021

(30) Foreign Application Priority Data
Jun. 29, 2018    (FR) ...................................... 1856045

(51) Int. Cl.
*C02F 1/469*        (2023.01)
*C02F 1/461*        (2023.01)
(Continued)

(52) U.S. Cl.
CPC ................ *C02F 1/469* (2013.01); *C02F 1/62* (2013.01); *C02F 1/66* (2013.01);
(Continued)

(58) Field of Classification Search
CPC ... C02F 1/463; C02F 2101/20–22; C25D 9/06
See application file for complete search history.

(56) References Cited

U.S. PATENT DOCUMENTS 2,945,790 A * 7/1960 Grigger .................... C25D 9/06
                                                       205/333
2,945,791 A * 7/1960 Gibson, Jr. ........... C25B 11/054
                                                       205/333
(Continued)

FOREIGN PATENT DOCUMENTS

EP    1 671 711 A1    6/2006
EP    2 419 382       2/2012
(Continued)

OTHER PUBLICATIONS

Lee et al, "Electrodeposition of PbO2 onto Au and Ti substrates", 2000, Electrochemistry Communications, 2, 646-652. (Year: 2000).*
(Continued)

*Primary Examiner* — Luan V Van
*Assistant Examiner* — Andrew Koltonow
(74) *Attorney, Agent, or Firm* — WC&F IP

(57) ABSTRACT

The present invention concerns a method for electrochemically depolluting an aqueous solution containing at least one heavy metal, said method comprising the following steps:
  a) a step of measuring the pH of the aqueous solution, optionally followed by a step of adapting said pH by adding a strong acid or a strong base,
  b) bringing said aqueous solution into contact with a reference electrode, a counter-electrode and a working electrode comprising a conductive substrate,
(Continued)

c) applying a constant potential to the arrangement, as a result of which a film of at least one heavy metal oxide is formed on said working electrode, this step being capable of being repeated when the aqueous solution contains several heavy metals, and d) recovering a depolluted aqueous solution and said film.

14 Claims, 2 Drawing Sheets

(51) Int. Cl.
  *C02F 1/62* (2023.01)
  *C02F 1/66* (2023.01)
  *C02F 101/20* (2006.01)

(52) U.S. Cl.
  CPC ............ *C02F 2001/46133* (2013.01); *C02F 2101/20* (2013.01); *C02F 2201/46135* (2013.01); *C02F 2209/06* (2013.01)

(56) References Cited

U.S. PATENT DOCUMENTS

| | | | | |
|---|---|---|---|---|
| 3,755,114 | A * | 8/1973 | Tarjanyi | C02F 1/4678 205/348 |
| 6,787,041 | B2 * | 9/2004 | Chwirka | C02F 1/281 210/688 |
| 8,603,344 | B2 * | 12/2013 | Konishi | C22B 3/22 210/201 |
| 2005/0211631 | A1 | 9/2005 | Muller | |
| 2010/0065502 | A1 | 3/2010 | Konishi | |

FOREIGN PATENT DOCUMENTS

| | | |
|---|---|---|
| FR | 2 997 804 A1 | 1/2013 |
| GB | 2 018 289 A | 10/1979 |
| JP | H08260175 A | 3/1995 |
| JP | 2000272922 A | 10/2000 |
| KR | 20080063797 A | 7/2008 |
| WO | 03062478 A1 | 7/2003 |
| WO | 2010/120882 A1 | 10/2010 |

OTHER PUBLICATIONS

F. J. Almazan-Ruiz et al., "Nickel recovery from an electroplating rinsingeffluent using RCE bench scale and RCE pilot plantreactors: The influence of pH control", Chemical Engineering Research and Design, 2015.

Natsui, K. et al., "Electrochemical Recovery of Copper fromModel Wastewater Using Boron-DopedDiamond Electrodes", ECS Meeting Abstracts, 2016.

* cited by examiner

METHOD FOR DECONTAMINATING HEAVY METALS IN AN AQUEOUS SOLUTION

The subject of the present invention is a method for decontaminating heavy metals in an aqueous solution, by implementing an electrochemical process.

Metal pollution can be due to different metals such as aluminium, arsenic, chromium, cobalt, copper, manganese, molybdenum, nickel, zinc . . . or to heavy metals such as cadmium, mercury or lead which are more toxic than the latter. Multiple activities by man carry responsibility. This pollution is essentially derived from industrial discharges and in particular from tanneries (cadmium, chromium), papermaking factories (mercury), chlorine producing factories (mercury) and metallurgical industries, farmland application of residual sludge from wastewater treatment stations, the use of some fungicides (mercury), falling atmospheric dust emitted after waste incineration (mercury) or from vehicle fuel combustion (lead), or rainwater runoff onto roofs and roads (zinc, copper, lead).

Metal pollution raises a particular problem since metals are not biodegradable. In addition, throughout the food chain, some become concentrated in living organisms. They can therefore reach very high levels in some species consumed by man, such as fish.

At the current time, depolluting or decontaminating methods to remove these pollutants, and heavy metals in particular, chiefly use physicochemical methods such as precipitation in solution to powder form, or membrane methods. These methods require filtration of the powder and do not necessarily allow separation from cadmium.

The objective of the present invention is to provide a simple method for decontaminating heavy metals in an aqueous solution, which in particular allows efficient separation of lead and cadmium.

A further objective of the invention is to provide a method for decontaminating heavy metals in an aqueous solution, that is low cost and only requires a very low electrical energy input.

A further objective of the present invention is to provide a method for decontaminating heavy metals in an aqueous solution allowing obviation of the filtering step usually needed to recover the materials in powder form.

A further objective of the present invention is to provide a method for decontaminating heavy metals in an aqueous solution which is efficient despite the presence of various salts in the solution such as chlorides, sulfates, nitrates or acetates, and irrespective of the concentrations thereof.

The present invention therefore concerns a method for electrochemically depolluting an aqueous solution containing at least one heavy metal, said method comprising the following steps:
  a) a step to measure the pH of the aqueous solution, optionally followed by a step to adapt said pH through the addition of a strong acid or strong base;
  b) contacting said aqueous solution with a reference electrode, a counter-electrode and a working electrode comprising a conductive substrate;
  c) applying a constant potential to the assembly, after which a film is formed of at least one heavy metal on said working electrode; and
  d) recovering a depolluted aqueous solution and said film, wherein the steps a), b), c) and d) can be repeated when the aqueous solution contains several heavy metals.

The present invention therefore concerns a method for electrochemically depolluting an aqueous solution containing at least one heavy metal, said method comprising the following steps:
  a) a step to measure the pH of the aqueous solution, optionally followed by a step to adapt said pH through the addition of a strong acid or strong base;
  b) contacting said aqueous solution with a reference electrode, a counter-electrode and a working electrode comprising a conductive substrate;
  c) applying a constant potential to the assembly, after which a film is formed of at least one heavy metal oxide on said working electrode; and
  d) recovering a depolluted aqueous solution and said oxide film,
  wherein the steps a), b), c) and d) can be repeated when the aqueous solution contains several heavy metals.

The method of the invention is particularly advantageous and efficient since it allows complete removal of heavy metals such as lead, irrespective of the concentrations of the heavy metals, and irrespective of the chemical species contained in the solution to be depolluted (chlorides, sulfates, nitrates or acetates) and the concentrations thereof (ionic strength).

The method of the invention is additionally very low cost and the equipment, in particular the electrodes, can be used several times without loss of efficacy.

This method is also advantageous in that it is conducted at ambient temperature and in air, with simple, low cost equipment and with very low electrical energy input.

The decontamination yields reached with this method are such that it is possible to envisage treatment of water for recycling in an industrial medium, treatment of industrial effluent before discharge, or in addition to conventional treatments.

In one embodiment, the method of the invention is conducted in a vessel preferably containing neither a separator, nor a membrane nor a diaphragm.

In one embodiment, the method of the invention does not comprise the addition of reagents or additional media to the solution to be depolluted, other than the above-mentioned strong acid or strong base.

In one embodiment, the method of the invention is not conducted in a specific medium such as a chloride or fluorosilicate medium.

In one embodiment, the method of the invention is conducted at ambient temperature.

In one embodiment, the method of the invention is conducted at temperature of between 10° C. and 50° C., in particular between 10° C. and 40° C.

Preferably, the method of the invention is conducted at atmospheric pressure.

In the invention, the aqueous solution containing at least one heavy metal such as defined above is also called hereafter «aqueous solution to be decontaminated», «contaminated aqueous solution», «aqueous solution to be depolluted» or «polluted aqueous solution».

According to the invention, the aqueous solution obtained on completion of the method is also called hereafter «depolluted aqueous solution» or «decontaminated aqueous solution».

In one embodiment, the aqueous solution to be decontaminated comprises at least 0.5 mg/L of at least one heavy metal.

In one embodiment, said aqueous solution comprises about 0.5 mg/L to 100 mg/L of at least one heavy metal.

According to the invention, the term «heavy metal» designates a natural metal element having a density higher than 5 g/cm³, and which can affect marine life and/or living beings on and after a certain concentration.

Among the heavy metals, mention can made for example of lead, copper, nickel, mercury, aluminium, titanium, arsenic, silver, bismuth, and mixtures thereof.

Preferably, in the invention, the heavy metals have the possibility of producing conductive oxides. More preferably, the heavy metals have the possibility of producing conductive or semiconductive oxides, in particular having a low solubility product (pKs) and in particular lower than 15.

Preferably, the heavy metal of the invention has at least two oxidation states: initially the metal is soluble in solution with one oxidation state (oxidation number+1) and it can then oxidize or be reduced (oxidation number+2) under the effect of the potential applied by forming an insoluble compound of oxide type in the form of an adhering thin film which is electronically conductive (or semiconductive).

In one advantageous embodiment, the heavy metals in the invention are selected from the group formed by lead, nickel, copper and mixtures thereof. Therefore, in one preferred embodiment, the aqueous solution comprises lead, nickel, copper or a mixture thereof.

In the invention, the aqueous solution to be decontaminated comprises a single heavy metal or a mixture of different heavy metals. In particular, as described below, when the aqueous solution contains several heavy metals, steps a), b), c) and d) can be repeated.

Step a)

As indicated above, the method of the invention comprises a prior step to measure the pH of the aqueous solution to be decontaminated. Depending on the measured pH and to obtain a desired range for implementing depollution, the method may additionally comprise a step to adapt the pH of said solution through the addition of a strong acid or strong base.

As strong acids, hydrochloric, sulfuric or nitric acids can be cited for example.

As strong bases, sodium hydroxide or potassium hydroxide can be cited for example.

In one embodiment, before step a), the method of the invention comprises a step to assay said aqueous solution to be decontaminated, in order to determine the type and preferably the concentration of the heavy metal(s) contained in said solution. Said step is performed following methods well known to persons skilled in the art.

As explained below, when the solution to be decontaminated comprises several heavy metals, this step a) can be repeated and the pH can then be measured and adapted to the type of heavy metals.

Step b)

The method of the invention further comprises a step to contact the aqueous solution to be decontaminated with an electrochemical system.

Said aqueous solution is therefore contacted with at least one reference electrode, a counter-electrode and a working electrode. As mentioned above, this step is conducted in a conventional vessel without any separator, membrane or diaphragm.

As reference electrode, mention can be made of any reference electrode conventionally used in electrochemical devices. For example, mention can be made of a saturated calomel electrode (SCE), mercury sulfate electrode (MSE) or silver chloride electrode.

In one embodiment, the reference electrode used in the invention is a mercury sulfate electrode.

As counter-electrode mention can be made of a counter-electrode conventionally used in electrochemical devices. Platinum can be cited for example.

In one embodiment, the counter-electrode used in the invention is a platinum wire.

As indicated above, the working electrode comprises at least one conductive substrate. This conductive substrate can be composed of a material selected from among conductive materials, semiconductive materials, noble metals and mixtures thereof.

In one embodiment, the conductive substrate is selected from the group formed by stainless steel, semiconductors, noble metals and mixtures thereof.

In the invention the working electrode can be a conductive substrate or it may comprise a conductive substrate. Therefore, in one embodiment, the working electrode comprises an insulating portion and a conductive portion. According to this embodiment, for example, the working electrode is formed of a glass plate at least partly coated with an optionally doped semiconductor material such as tin dioxide $SnO_2$.

In one preferred embodiment, the working electrode is a glass plate coated with $SnO_2$ or a stainless-steel electrode.

As explained below, when the solution to be decontaminated comprises several heavy metals, this step b) can be repeated and the electrodes used are not necessarily the same. For example, it is possible to use a first working electrode to remove a first heavy metal, then a second working electrode, the same or different, to remove another heavy metal.

Step c)

After contacting the different electrodes with the solution to be decontaminated, a constant potential is applied to the assembly.

In one embodiment, the potential to be applied is determined according to the type of metal to be decontaminated, and according to the measured pH optionally adapted at step a)

Preferably, step c) of the invention comprises the performing of chronoamperometry using a potentiostat.

This step, namely the application of a potential, allows the forming of a film of at least one heavy metal oxide on the working electrode such as defined above.

As explained below, when the solution to be decontaminated comprises several heavy metals, this step c) can be repeated and the potential can be adapted to the type of heavy metals. After these repeated steps c), several heavy metal films are obtained, in particular films of heavy metal oxides, which are successively recovered particularly in pure form. As indicated above, each film can be recovered on different working electrodes.

Step d)

After step c), the heavy metal film, heavy metal oxide film, or the films of heavy metals in particular heavy metal oxides (when the solution to be decontaminated contains several heavy metals) are recovered. In addition, a decontaminated or depolluted solution is obtained.

Preferably, the solution obtained after step d) is a depolluted aqueous solution in which the heavy metal concentration is in the region of $10^{-8}$ mol/L, i.e. 2.07 µg/L.

WHO standards (see https://www.epd.gov.hk/eia/register/report/eiareport/eia_2242014/EIA/app/app02.02.pdf) provide for lead contents of 10 µg/L Therefore, the present invention further concerns a heavy metal film able to be obtained with the method such as defined above.

Therefore, the present invention further concerns a film of at least one heavy metal oxide able to be obtained with the method such as defined above.

Preferably, the film thus obtained is a thin film in the form of an adhering layer having a thickness in particular of approximately one micrometre, in particular of between 1 µm and 20 µm.

When the aqueous solution to be depolluted contains lead, the method of the invention can be implemented as follows depending on the pH value of said solution.

In one embodiment, the method of the invention for depolluting an aqueous solution containing lead and having a pH lower than 8 comprises steps a) and b) such as defined above, and step c) is conducted as follows:
  if the pH of the aqueous solution containing lead is lower than or equal to 4, the potential at step c) is between 1.65 V and 1.95 V (relative to the standard hydrogen electrode SHE); and
  if the pH of the aqueous solution containing lead is between 4 and 8, the potential at step c) is between 1.15 V and 1.85 V relative to the SHE.

In one embodiment, when the aqueous solution to be depolluted containing lead has a pH higher than 8, step a) is followed by a step to add a strong acid e.g. HCl, $HNO_3$ or $H_2SO_4$, to obtain an aqueous solution having a pH of between 4 and 8.

At step c), a potential of between 1.15 V and 1.85 V is applied (relative to the standard hydrogen electrode).

The present invention further concerns a method such as defined above for depolluting an aqueous solution containing copper, wherein:
  if the pH of said aqueous solution containing copper, measured at step a), is higher than 8, said step a) is followed by a step to add a strong acid e.g. HCl, $HNO_3$ or $H_2SO_4$, and if said pH is lower than 4, said step a) is followed by a step to add a strong base e.g. NaOH or KOH, to obtain an aqueous solution having a pH of between 4 and 8,
  and wherein the potential at step c), applied to said aqueous solution having a pH of between 4 and 8, is between 0.15 V and 0.25 V relative to the SHE.

The present invention further concerns a method such as defined above for depolluting an aqueous solution containing nickel, wherein:
  if the pH of said aqueous solution containing nickel, measured at step a), is higher than 8, said step a) is followed by a step to add a strong acid e.g. HCl, $HNO_3$ or $H_2SO_4$, and if said pH is lower than 4, said step a) is followed by a step to add a strong base e.g. KOH or NaOH, to obtain an aqueous solution having a pH of between 4 and 8;
  and wherein the potential at step c), applied to said aqueous solution having a pH of between 4 and 8, is between 1.35 V and 1.55 V relative to the SHE.

The present invention also concerns a method for separating cadmium from other heavy metals in an aqueous solution comprising cadmium and at least one heavy metal differing from cadmium, said method comprising implementation of the steps of the methods of the invention as defined above.

In particular, in this embodiment, the solution to be depolluted contains at least cadmium and at least one other heavy metal selected for example from among lead, nickel and/or copper. With this method it is possible to separate cadmium since cadmium cannot be removed and therefore remains in the solution contrary to the other heavy metals.

As indicated above, the method of the invention can be applied to depollute solutions comprising mixtures of heavy metals.

The present invention therefore also concerns a method for electrochemically depolluting an aqueous solution S1 containing at least two heavy metals M1 and M2, said method comprising the following steps:
  a) a step to measure the pH of the aqueous solution S1, optionally followed by a step to adapt said pH through the addition of a strong acid or strong base;
  b) contacting said aqueous solution S1 with a reference electrode, a counter-electrode and a working electrode WE1 comprising a conductive substrate;
  c) applying a constant potential E1 to the assembly, after which a film of the heavy metal M1 is formed on said working electrode WE1;
  d) recovering an aqueous solution S2, from which the metal M1 has been removed, and the film of the metal M1;
  e) a step to measure the pH of the aqueous solution S2, optionally followed by a step to adapt said pH through the addition of a strong acid or strong base;
  f) contacting said aqueous solution S2 with a reference electrode, a counter-electrode and a working electrode WE2 comprising a conductive substrate, these electrodes possibly being the same or differing from those of step b);
  g) applying a constant potential E2 to the assembly, after which a film of the heavy metal M2 is formed on said working electrode WE2, the potentials E1 and E2 being the same or different; and
  h) recovering an aqueous solution S3, from which the metals M1 and M2 have been removed, and the film of metal M2.

The present invention further concerns a method for electrochemically depolluting an aqueous solution S1 containing at least two heavy metals M1 and M2, said method comprising the following steps:
  a) a step to measure the pH of the aqueous solution S1, optionally followed by a step to adapt said pH through the addition of a strong acid or strong base;
  b) contacting said aqueous solution S1 with a reference electrode, a counter-electrode and a working electrode WE1 comprising a conductive substrate;
  c) applying a constant potential E1 to the assembly, after which a film is formed of at least one oxide of the heavy metal M1 on said working electrode WE1;
  d) recovering an aqueous solution S2, from which the metal M1 has been removed, and the film of at least one oxide of the metal M1;
  e) a step to measure the pH of the aqueous solution S2, optionally followed by a step to adapt said pH through the addition of a strong acid or strong base;
  f) contacting said aqueous solution S2 with a reference electrode, a counter-electrode and a working electrode WE2 comprising a conductive substrate, these electrodes possibly being the same or differing from those of step b);
  g) applying a constant potential E2 to the assembly, after which a film is formed of at least one oxide of the heavy metal M2 on said working electrode WE2, the potentials E1 and E2 being the same or different; and
  h) recovering an aqueous solution S3, from which the metals M1 and M2 have been removed, and the film of at least one oxide of the metal M2.

When the aqueous solution to be depolluted contains more than two heavy metals, steps a), b), c) and d) (or e), f), g) and h)) are repeated depending on the type of metal or metals.

In one embodiment, to perform the successive steps of contacting the solutions to be decontaminated, said solutions can be contacted with the same assemblies of electrodes (reference electrode, counter-electrode and working electrode), but in different successive baths containing the solutions to be decontaminated. For example, as described above, when the solution to be decontaminated contains two heavy metals M1 and M2, the electrodes are placed in contact with this solution to remove the heavy metal M1, allowing an aqueous solution to be obtained containing the heavy metal M2 (but without the heavy metal M1), the solution then being recovered. Next, a different working electrode, and the same reference and counter-electrodes are placed in contact with said aqueous solution containing the heavy metal M2. A solution is then recovered from which the metals M1 and M2 have been removed.

EXAMPLES

In all the examples described below, the decontamination method was conducted in the following manner:
- a conventional 80 mL reactor (beaker type); and
- three electrodes: a reference electrode (mercury sulfate), a counter-electrode (platinum wire) and the working electrode on which the adhering film will be deposited, which is either a glass plate coated with $SnO_2$ or it is in stainless steel (60×15 mm) where the surface in contact with the solution is limited by scotch tape (3 cm$^2$).

Experiments were conducted in air without the need for degassing to remove dissolved oxygen, at ambient temperature, under average constant stirring at atmospheric pressure. For stirring, a magnetic stir bar was used (speed set at 250 rpm). The advantage of stirring is fast acceleration of the method.

The decontamination method uses a potentiostat for chronoamperometry, i.e. applying a constant potential which remains the same throughout the entire duration of the experiment.

The value of the applied potential varies according to the heavy metal and the pH of the solution, as specified in the examples below.

The time length of the experiment is a function of the initial concentration of the dissolved heavy metal contained in solution, since when it is fully removed the current becomes practically zero and constant, indicating that the experiment is completed.

Example 1: Case of Lead Removal

For an acid solution of pH 4, the lead decontamination method is conducted under a potential of between 1 and 1.2 V/Mercury sulfate electrode, corresponding to 1.65 and 1.85 V/SHE (Standard Hydrogen Electrode).

For a solution having a pH of between 4 and 8, the Pb decontamination method is conducted under a potential of between 0.7 and 0.9 V/Mercury sulfate electrode (1.35 and 1.55 V/SHE).

All the Pb is removed in the form of a thin adhering oxide film deposited on the conductive substrate, composed solely of lead and oxygen.

Example of Treating a Solution Having a Concentration of 27 mg/L Pb (II) (6.5×10$^{-6}$ Mol in 50 mL, i.e. 1.3×10$^{-4}$ mol/L) on $SnO_2$ Electrode:

Two Possible Treatments Depending on the Initial pH of the Solution:
1. If pH=2, the Pb was fully removed from this solution in the form of an adhering film of lead oxide composed solely of lead and oxygen (about 70% and 30% Pb), deposited on the $SnO_2$ substrate, by applying a potential of 1 V/Mercury sulfate electrode for 12 hours.
2. If pH=4.2 the Pb was fully removed in the form of an adhering film of lead oxide composed solely of lead and oxygen (about 60% and 40% Pb), deposited on the $SnO_2$ substrate, by applying a potential of 0.7 V/Mercury sulfate electrode for 8 hours.

Decontamination of Pb (II) under these two conditions was 99.99%. After these treatments, the measured remaining concentration was approximately 10$^{-8}$ M (2.07 µg/L) which corresponds to environmental and drinking water standards.

Figure 1:
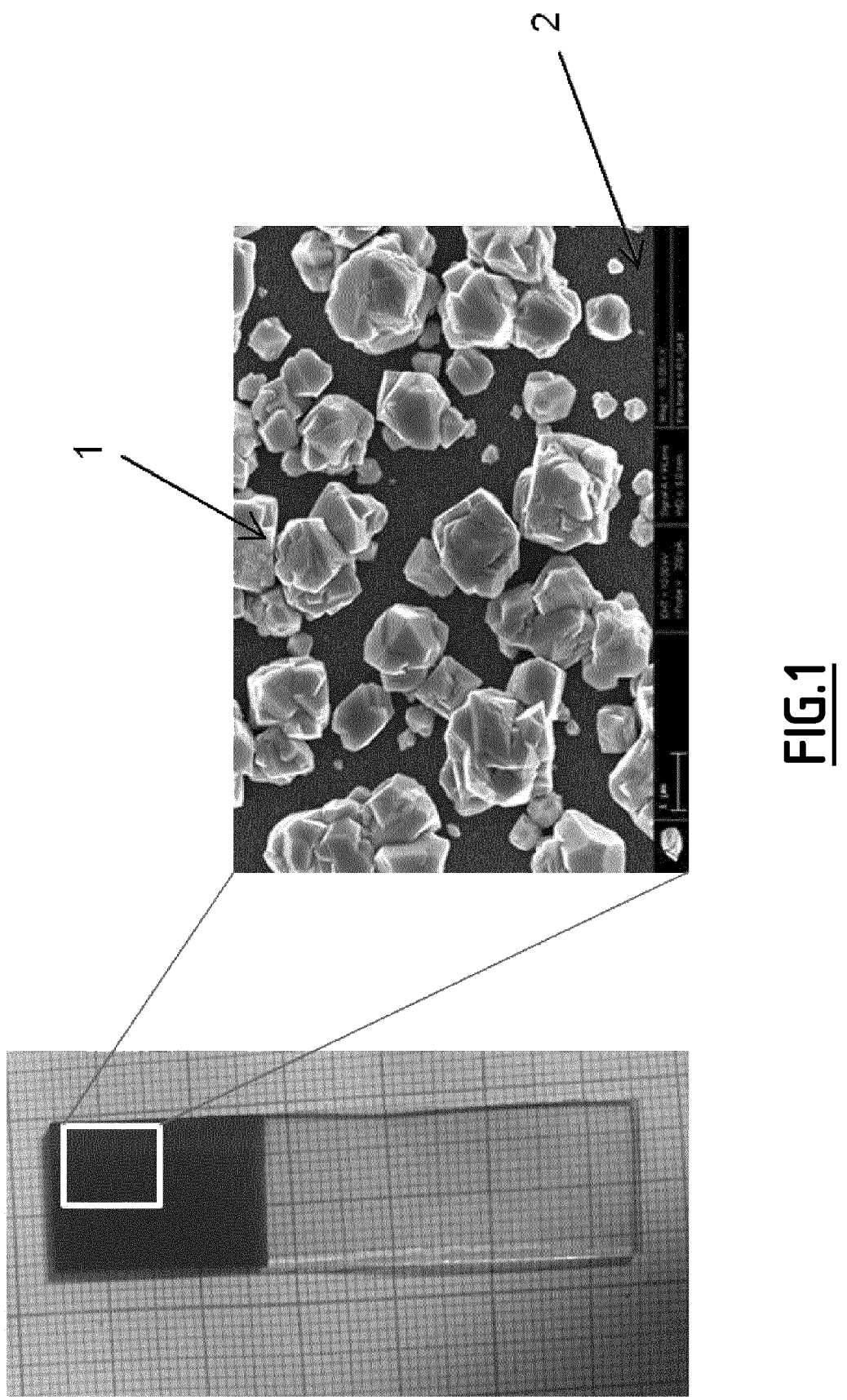
FIG. 1 is a Scanning Electron Microscopy (SEM) image of a working electrode indicating the removed lead crystals and the conductive substrate of tin dioxide.

The solid formed on the working electrode (e.g. $SnO_2$) was characterized by Scanning Electron Microscopy (SEM) as illustrated in FIG. 1 («1» indicating removed lead crystals and «2» indicating the conductive substrate of tin dioxide).

Figure 2:
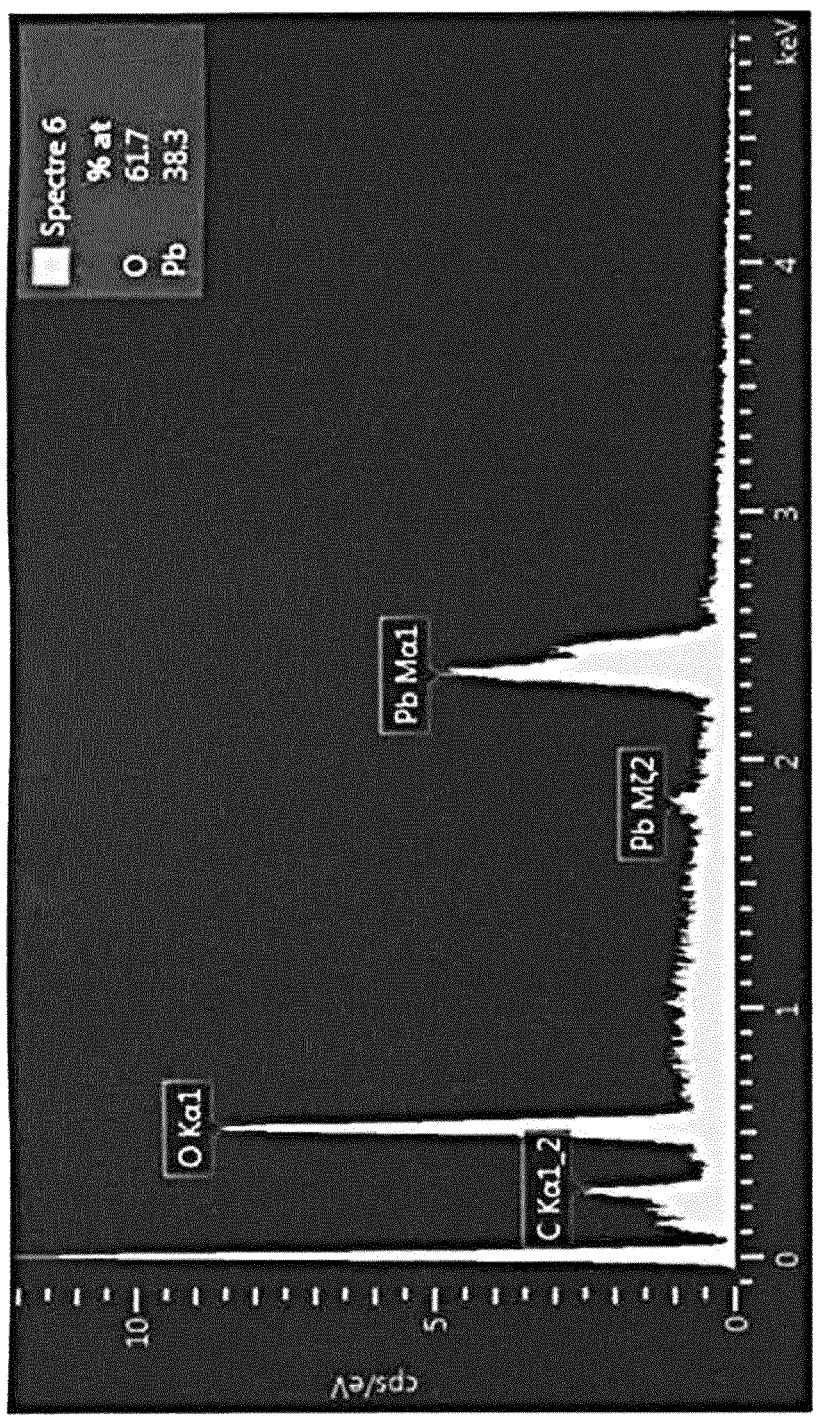
FIG. 2 is a graph showing an Energy Dispersive Spectroscopy (EDS) of the film composed of lead and oxygen.

Energy dispersive spectroscopy EDS confirmed that the film was composed solely of lead and oxygen with the following percentages: about 60% O and about 40% Pb (FIG. 2).

To test the impact of the presence of salts in solution, the same tests were conducted with a solution containing either NaCl, or $Na_2SO_4$, or $NaNO_3$ or sodium acetate, at a concentration each time of 1 mol/L. In all cases, full decontamination of Pb was always obtained in the form of an adhering film of pure lead oxide solely containing oxygen and lead with equivalent percentages to the foregoing (60% O and 40% Pb), on the conductive electrode (e.g. $SnO_2$), irrespective of the species present in solution.

Example 2: Case of Copper Removal

If the pH of the solution is acid and lower than 4, Cu is not removed according to this decontamination method.

For a solution having a pH between 4≤pH≤8, the Cu decontamination method is conducted under a potential of between −0.4 V and −0.5 V/Mercury sulfate electrode (0.25 and 0.15 V/SHE). Under these conditions, decontamination of Cu (II) is about 99.99%. Cu is removed in the form of a thin adhering film of copper oxide (about 50% O and 50% Cu), deposited on the conductive substrate (e.g. $SnO_2$).

Example of Decontamination for a Solution of 8.2 mg/L (6.5×10$^{-6}$ mol in 50 ml, i.e. 1.3×10$^{-4}$ mol/L) on $SnO_2$ Electrode:

For a solution having pH=7, Cu was fully removed in the form of an adhering film deposited on the $SnO_2$ substrate, by applying a potential of −0.45 V/Mercury sulfate electrode for 48 h (0.2 V/SHE).

Example 3: Case of Nickel Removal

For a solution having a pH of between 4 pH 8: the Ni decontamination method is conducted under a potential of between 0.7 and 0.9 V/Mercury sulfate electrode (1.35 and 1.55 V/SHE).

Example of Decontamination for a Solution of 7.6 mg/L ($6.5 \times 10^{-6}$ mol in 50 ml, i.e. $1.3 \times 10^{-4}$ mol/L)

For pH=4.2, Ni was fully removed in the form of an adhering film deposited on the $SnO_2$ substrate, by applying a potential of 0.7 V/Mercury sulfate electrode (1.35 V/SHE) for 72 h.

Example 4: Case of Cadmium Alone

Cd cannot be removed with this method irrespective of pH conditions of the solution since it only has one oxidation state. This is a point of great interest for very good separation of cadmium from other heavy metals since it remains quantitatively in solution.

Example 5: Case of a Mixture of Lead, Nickel, Copper and Cadmium

An experiment was conducted with a mixture of these 4 heavy metals (Pb, Cu, Ni, Cd) having the same initial amount in solution ($6.5 \times 10^{-6}$ mol in 50 mL, i.e. a concentration of $1.3 \times 10^4$ mol/L for each). The value of the initial pH of the solution, before any adjustment, was close to ≈1.9.

Removal treatment of each metal contained in this mixture was conducted separately:

First, to remove Pb, the pH of the solution, before any adjustment, was 1.9 (acid), therefore no need to change the pH. A potential E=1 V was applied.

After 24 hours, all the Pb was removed in the form of a solid oxide film adhering to the electrode.

Next, to remove Ni, the pH was adjusted to pH ≈4 through the addition of 400 µL of 1M NaOH for a volume of 50 mL. A potential E=0.7 V was applied. After 3 days, all the Ni was removed in the form of a solid film adhering to the electrode.

The pH value was then adjusted to pH ≈7 to remove Cu by applying a potential E=−0.45 V for 2 days. After this treatment, the copper was removed in the form of a solid film adhering to the electrode.

The Cd remained fully and quantitatively in solution.

The invention claimed is:

1. Method for electrochemically depolluting an aqueous solution containing at least one heavy metal including lead, said method comprising the following steps:
   a) a step to measure the pH of the aqueous solution, optionally followed by a step to adapt said pH through the addition of a strong acid or strong base;
   b) contacting said aqueous solution with a reference electrode, a counter-electrode and a working electrode comprising a conductive substrate;
   c) applying a constant potential to the assembly, after which a film is formed of at least one heavy metal oxide on said working electrode; and
   d) recovering a depolluted aqueous solution and said oxide film;
   wherein steps a), b), c) and d) can be repeated when the aqueous solution contains several heavy metals,
   wherein the method is conducted at a temperature of between 10° C. and 50° C., and
   wherein step c) is applied until the current becomes zero and constant, such that there is no more lead in the aqueous solution.

2. The method according to claim 1, wherein the conductive substrate is selected from the group composed of stainless steel, semiconductors, noble metals and mixtures thereof.

3. The method according to claim 1, wherein the other heavy metal is selected from the group consisting of copper, nickel, mercury, aluminium, titanium, arsenic, silver, bismuth, and mixtures thereof.

4. The method according to claim 1, wherein the aqueous solution comprises nickel and/or copper in addition to lead.

5. The method according to claim 1 for depolluting an aqueous solution containing lead, having a pH lower than 8, wherein:
   if the pH of the aqueous solution containing lead is lower than or equal to 4, the potential at step c) is between 1.65 V and 1.95 V (relative to the standard hydrogen electrode); and
   if the pH of the aqueous solution containing lead is between 4 and 8, the potential at step c) is between 1.15 V and 1.85 V (relative to the standard hydrogen electrode).

6. The method according to claim 1 for depolluting an aqueous solution containing lead, having a pH higher than 8, wherein step a) is followed by a step to add a strong acid to obtain an aqueous solution having a pH of between 4 and 8, and wherein at step c) a potential is applied of between 1.15 V and 1.85 V (relative to the standard hydrogen electrode).

7. The method according to claim 1 for depolluting an aqueous solution containing copper in addition to lead, wherein:
   if the pH of said aqueous solution containing copper, measured at step a), is higher than 8, said step a) is followed by a step to add a strong acid, and if said pH is lower than 4, said step a) is followed by a step to add a strong base, to obtain an aqueous solution having a pH of between 4 and 8;
   and wherein the potential at step c), applied to said aqueous solution having a pH of between 4 and 8, is between 0.15 V and 0.25 V (relative to the standard hydrogen electrode).

8. The method according to claim 1 for depolluting an aqueous solution containing nickel in addition to lead, wherein:
   if the pH of said aqueous solution containing nickel, measured a step a), is higher than 8, said step a) is followed by a step to add a strong acid, and if said pH is lower than 4, said step a) is followed by a step to add a strong base, to obtain an aqueous solution having a pH of between 4 and 8;
   and wherein the potential at step c), applied to said aqueous solution having a pH of between 4 and 8, is between 1.35 V and 1.55 V (relative to the standard hydrogen electrode).

9. The method according to claim 1, wherein step c) comprises the performing of chronoamperometry using a potentiostat.

10. The method according to claim 1, which is conducted at a temperature of between 10° C. and 40° C.

11. The method according to claim 1, which is conducted at ambient temperature.

12. The method according to claim 1, wherein the method is conducted at atmospheric pressure.

13. The method according to claim 1, wherein the method is conducted without degassing to remove dissolved oxygen.

14. The method according to claim 1, wherein the method is conducted under stirring.

* * * * *